Oct. 16, 1928.
J. J. WEIER
1,687,701
MUD GRIP
Filed Nov. 8, 1926
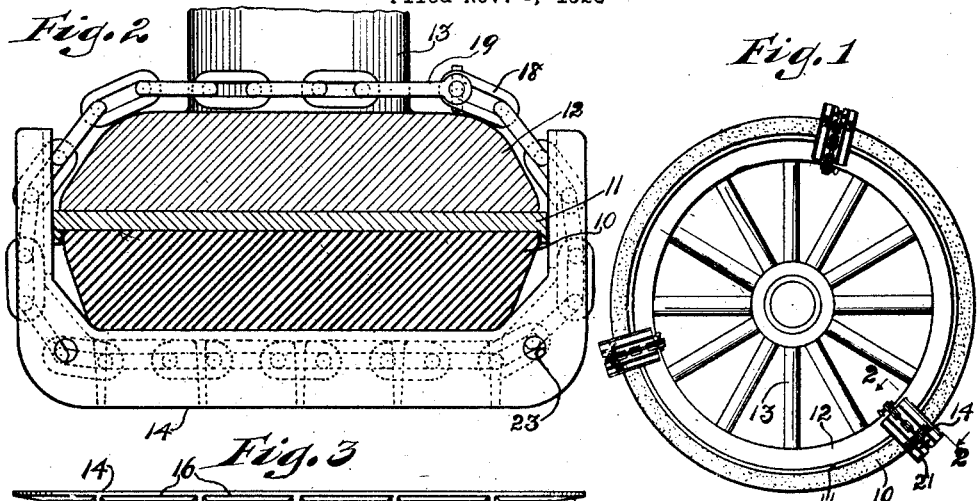
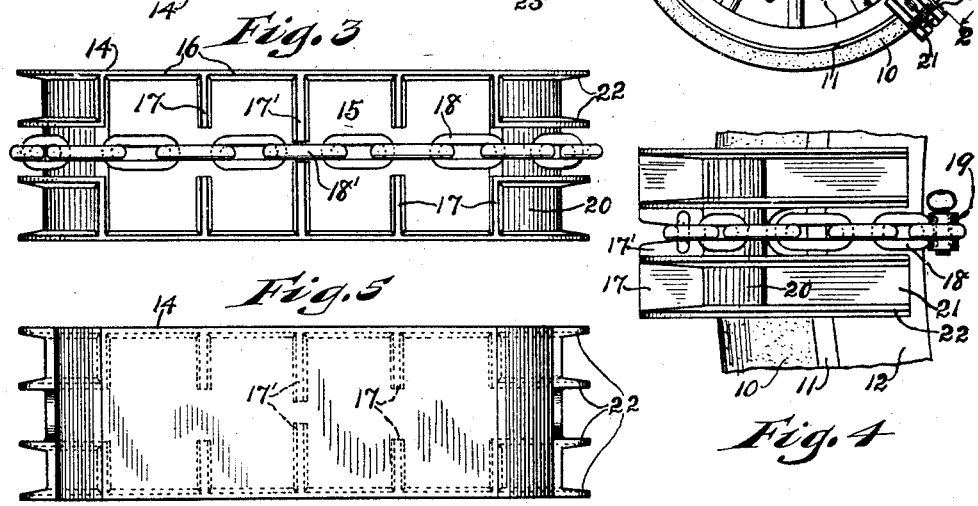
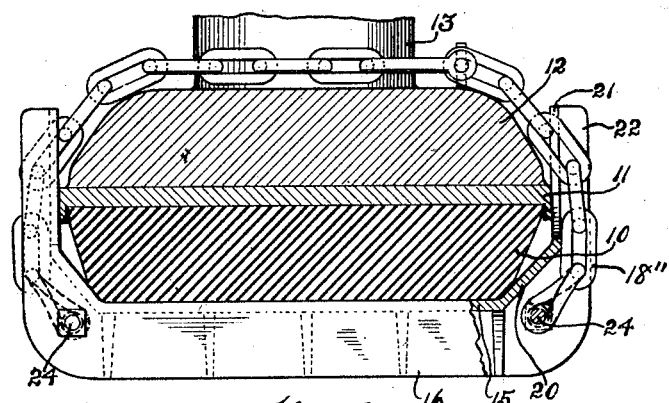
Inventor.
Jacob J. Weier.
By J. Daniel Stuwe
Attorney.

Patented Oct. 16, 1928.

1,687,701

UNITED STATES PATENT OFFICE.

JACOB J. WEIER, OF CHICAGO, ILLINOIS.

MUD GRIP.

Application filed November 8, 1926. Serial No. 146,886.

My invention pertains to a mud grip; and more particularly to a grip or shoe device applied to the wheel of an automobile, truck or the like, to afford traction and prevent skidding.

The main object of the invention is to provide a mud grip having side means including tongues which engage along the sides of the tire and the felloe of a wheel to positively prevent sliding of the mud grip transversely of the wheel, as well as circumferentially thereof.

Another object is to provide a mud grip with spaced traction elements thereon and spaced end tongues, and a chain mounted between said elements and tongues and directly engaging the sides and inner face of the felloe, to positively hold the grip in position on the wheel.

A further object is to provide a mud grip with spaced outer ribs and with end flanges having transverse holes therein, to adapt the grip to the use of a long chain placed between said ribs and extending around the grip and the felloe, for heavy wear, or to bolt the ends of a shorter chain to said holes and to have its intermediate part surround the felloe, for the lighter construction and wear.

These and other objects and advantages will become apparent from the following description taken in connection with the drawing, which illustrates a preferred embodiment of my invention, and in which, Fig. 1 is a side view of a wheel with a certain form of my invention applied thereto;

Fig. 2 is an enlarged cross section on line 2—2 of Fig. 1, showing the mud grip with a long chain surrounding the grip and the felloe;

Fig. 3 is an outside view of my mud grip;

Fig. 4 is an end view of the mud grip, seen from the side of the wheel;

Fig. 5 is an inside view of my invention; and

Fig. 6 shows the grip used with a short chain thereon.

In the drawing I have shown a preferred form of construction embodying my invention, and which is arranged to be mounted over the tire 10 with its rim 11 seated over the felloe 12 of a wheel 13. This grip is arranged for the use of either a long chain which surrounds the grip as well as the felloe, as shown in Figs. 1 to 4, inclusive, and adapting the device for heavy and rough uses and wear; and is also adapted for use of a short chain, as shown in Fig. 6, adapting the device for lighter usage and for use of a main part of a broken long chain.

My improved form of grip comprises a shoe 14 including a main or body portion having a plate 15 which engages the outside of the tire 10, and which has traction elements on its outer side including flanges 16 and transverse ribs 17 extending inward therefrom but spaced apart transversely and longitudinally of the shoe, thus adapting the device for the use of a long chain 18 which is positioned between said ribs and surrounds the shoe, tire and felloe. The central ribs 17' are spaced only the thickness of a link, as best shown in Fig. 3, thus being adapted to hold a link 18' therebetween radially of the wheel, and to engage the adjacent links in any attempt to move lengthwise of the chain, to prevent excessive movement of the chain. The ends of the chain are preferably fastened together by a clevis or anchor shackle 19.

I provide the shoe with means at the ends which engage the tire with its rim at the sides, and this end means includes curved parts 20 extending from plate 15 and having tongues 21 extending therefrom closely along the sides of the tire, rim and felloe, said tongues being spaced apart to allow the chain to rest in the space therebetween and to directly engage the sides of the felloe. Flanges 22 extend outward from said parts 20 and tongues 21, and the chain is retained between the two central flanges and in the space. The main outward parts of these flanges 22 also provide traction elements, along with flanges 16 and ribs 17.

The flanges 22 are further provided with bores or holes 23 to receive suitable bolts 24 therethrough, for engaging the ends of a short chain 18'', which surrounds the felloe 12 like the long chain 18, but does not surround the shoe. This short chain may be a remaining part of a broken long chain 18, or may be any short chain provided for the purpose.

It is apparent from the above disclosure that with this construction of a mud grip, the main part or shoe is arranged to positively prevent movement sideways as well as circumferentially on the wheel, especially by means of the tongues with the flanges and the chain which closely engages the tire, rim and felloe; and that a long chain may be used around the shoe and the wheel, for heavy and rough wear, or a short chain may be used, being less expensive, and also that when a long chain breaks its main part may be used with suitable bolts 24 to fasten its ends on the shoe, and that in either case the chain surrounds and clamps the felloe and with the closely fitting side elements 20 and 21 provide a construction which firmly remains in position on the wheel.

What I claim as my invention and desire to secure by Letters Patent is:

1. A mud grip for a wheel having a felloe and a rim and a solid tire, said grip comprising a body portion, end means on said body portion for closely engaging the sides of said solid tire and rim and having spaced flanges, said end means and flanges extending inwardly from said portion for the depth of said tire and rim and felloe, and chain means extending between said spaced end flanges and through spaces on said end means for closely engaging the felloe and firmly holding the grip in position.

2. A mud grip for a wheel having a felloe and a tire, said grip comprising a shoe or body portion extending across the tire, end means on said body portion for engaging the sides of the tire and including flanges and tongues extending transversely inwardly from said portion, at the sides of the tire and having a space between said tongues, there being holes in said end flanges and bolts therein, and chain means attached to said bolts and extending therefrom between said tongues and around the felloe.

3. A mud grip for a wheel having a felloe and a rim and a tire, said grip comprising a shoe including a body plate with a flat inner face extending across said tire and being provided with traction elements and with end means for closely engaging the sides of the tire and including flanges which extend longitudinally of the shoe and the inner two of which have holes therein, spaced tongues extending between said flanges transversely of said shoe, and an ordinary chain extending around the felloe and through the space between said tongues and having means for engaging in said holes to fasten its ends to the shoe.

4. A mud grip adapted for a wheel which has a felloe and a rim and a solid tire thereon, said mud grip comprising a substantially flat body plate extending flat across said tire face and having traction elements on its outer side, curved end means at the ends of said plate for engaging the sides of the tire and having spaced tongues which extend inwardly therefrom closely along the sides of the tire and rim and felloe and which snugly clasp said rim, spaced flanges extending out from said curved end means and from said tongues and being directed radially of the wheel, some of said flanges having holes therein, a bolt extending through said holes at each end of said mud grip, and a chain extending around the felloe then through the spaces between said tongues and having its ends releasably held by said bolts, thus positively preventing movement of said mud grip sideways as well as circumferentially on the wheel.

In testimony whereof I have signed my name to this specification.

JACOB J. WEIER.